(No Model.)
H. J. CASE & C. YOUNG.
TRUCK ATTACHMENT FOR HARVESTERS.
No. 358,835. Patented Mar. 8, 1887.
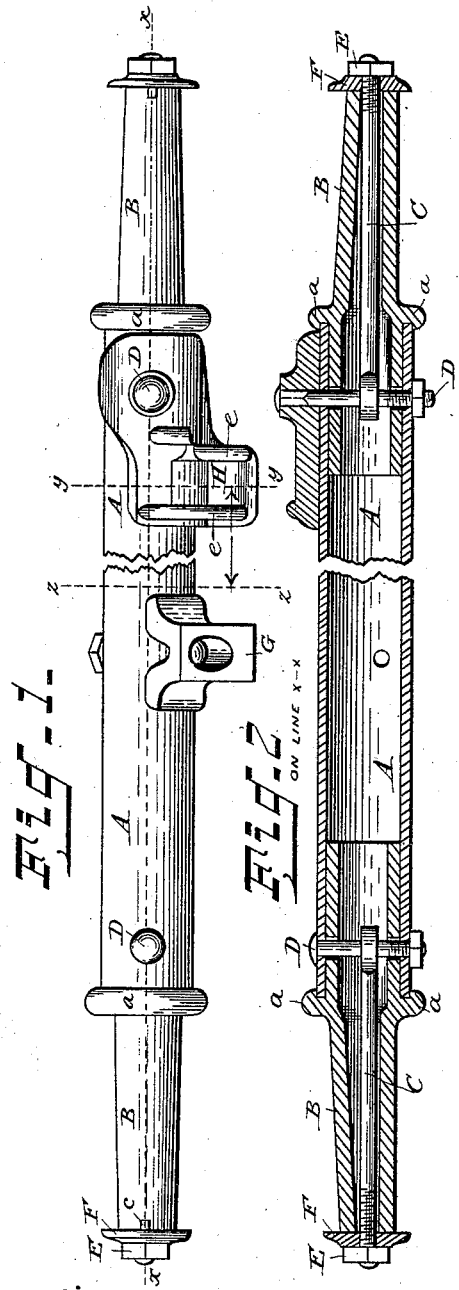
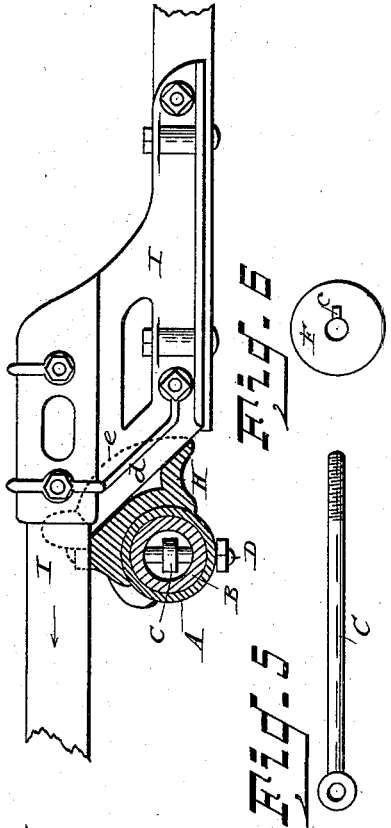
Witnesses:
William H. Shipley
A. P. Hollingsworth
Inventors:
H. J. Case
Calvin Young
By P. T. Dodge atty

United States Patent Office.

HENRY J. CASE AND CALVIN YOUNG, OF AUBURN, NEW YORK, ASSIGNORS OF ONE-HALF TO D. M. OSBORNE & COMPANY, OF SAME PLACE.

TRUCK ATTACHMENT FOR HARVESTERS.

SPECIFICATION forming part of Letters Patent No. 358,835, dated March 8, 1887.

Application filed August 3, 1886. Serial No. 209,857. (No model.)

*To all whom it may concern:*

Be it known that we, HENRY J. CASE and CALVIN YOUNG, of Auburn, in the county of Cayuga and State of New York, have invented certain Improvements in Truck Attachments for Grain Harvesting and Binding Machines, of which the following is a specification.

At the present day it is a common practice in the art to apply temporarily to grain harvesting and binding machines truck-wheels at right angles to the main or ground wheel, in order that the machine may be drawn in an endwise direction while being transported from place to place, to the end that it may be carried through gates and other narrow openings.

The aim of our invention is to provide an inexpensive, secure, and convenient means for attaching the truck-wheels; and to this end it consists in an axle for the truck-wheels provided with bearing-blocks and adapted to be slipped into position beneath the harvester-frame.

In the accompanying drawings, Figure 1 represents a side elevation of our axle, the middle portion being broken away in order to reduce the size of the figure. Fig. 2 is a longitudinal section of the same on the line $x\ x$. Fig. 3 is a cross-section on the line $z\ z$, looking in a forward direction, the axle being in position under the frame of the harvester. Fig. 4 is a cross-section on the line $y\ y$, looking in a rearward direction. Fig. 5 is a view of one of the eyebolts used for connecting the journals to the end of the axle. Fig. 6 is an inside face view of the washer or collar used on the outer end of the journal.

In the drawings, A represents the body of the axle, made of tubular form, preferably of a section of wrought-iron pipe, and of suitable length to extend transversely under the harvester-frame from front to rear. At each end the axle is provided with a cast-iron journal, B, tapered or otherwise formed at the outer end to receive a wheel, and adapted at its inner end to fit tightly within the axle. Each journal is provided with an annular flange, $a$, adapted to fit over and around the axle, as shown, whereby the parts are the more firmly united and the axle strengthened, so that splitting or cracking is prevented.

Each journal is made of tubular form and held in place by means of a central eyebolt, C, the inner end of which is mounted on a vertical bolt, D, passing through the journal and axle, as shown, while the outer end is projected through and beyond the journal and provided with a nut, E, and with a washer or plate, F, which holds the wheel in position.

The washer F is provided, as shown in Fig. 6, with a lip, $c$, entering a notch in the journal, whereby it is prevented from rotating and turning the nut, as it would otherwise be liable to do.

At opposite ends the axle is provided with external pillow-blocks, G and H, adapted to bear against and interlock with the inside of the harvester-frame I. These blocks may be variously formed to correspond with the under side of the frame, the principal requirement being that the parts shall interlock securely with each other, so that the axle shall be retained in position wholly or mainly by the weight of the frame.

We prefer to form the harvester-frame I at its front with an angular seat, $g$, to receive the forward block, G, and at its rear with an inclined bearing-face, $d$, to receive the rear block, H. The block H is provided with vertical flanges $e$, which embrace the front and rear edges of the frame in such manner as to prevent the axle from moving endwise thereunder.

The advantages of our construction reside, first, in the fact that the attachment may be cheaply constructed, and, second, that it may be applied by simply raising the main frame from its wheels and passing the truck-axle thereunder, applying the truck-wheels, and then lowering the main frame upon the truck-axle, thus avoiding much of the labor and delay which are involved in bolting or otherwise attaching the truck-axles in methods heretofore employed.

While we are aware that truck-axles are commonly inserted beneath harvester-frames, we believe ourselves to be the first to provide an axle with bearings to cause its engagement with the frame when the latter is lowered thereon, and the first to provide a frame with seats or bearings to maintain the axle in position thereunder.

Having thus described our invention, what we claim is—

1. In combination with the harvester-frame having seats or bearings in its lower edge, a movable transverse axle seated in said seats and retained therein by the weight of the machine, whereby lateral motion of the axle beneath the frame is prevented.

2. In combination with a harvester-frame, an axle to receive truck-wheels, extended transversely beneath the harvester-frame, the frame provided with seats to prevent lateral motion of the axle, and the axle provided with the bearing-surface to prevent its longitudinal motion beneath the frame, whereby the axle is retained in position by the weight of the frame and adapted for instantaneous removal and the necessity of bolts or other fastening devices avoided.

3. In combination with the tubular axle-body, the tubular journal, the longitudinal eyebolt, and the transverse bolt, substantially as described and shown.

4. In combination with the tubular axle-body and the transverse bolt D, the tubular journal, the longitudinal bolt C, the washer F, and nut E.

5. In combination with the tubular axle, the external block H, and the journal B, the transverse bolt D, serving to hold both the journal and the block in place.

6. In combination with the harvester-frame, a supplemental truck-axle extended transversely thereunder, said axle provided with permanent flanges or shoulders adapted to interlock with the frame and prevent the longitudinal motion of the axle thereunder, whereby the weight of the frame is caused to retain the axle against longitudinal movement without the assistance of bolts or other movable fastening devices.

In testimony whereof we hereunto set our hands, this 26th day of July, 1886, in the presence of two attesting witnesses.

HENRY J. CASE.
CALVIN YOUNG.

Witnesses:
T. M. OSBORNE,
J. FRANK DAVIS.